Sept. 4, 1934.  E. A. VESSEY  1,972,175
HYDRAULIC INFINITELY VARIABLE SPEED TRANSMISSION MECHANISM
Filed June 20, 1929  3 Sheets-Sheet 1
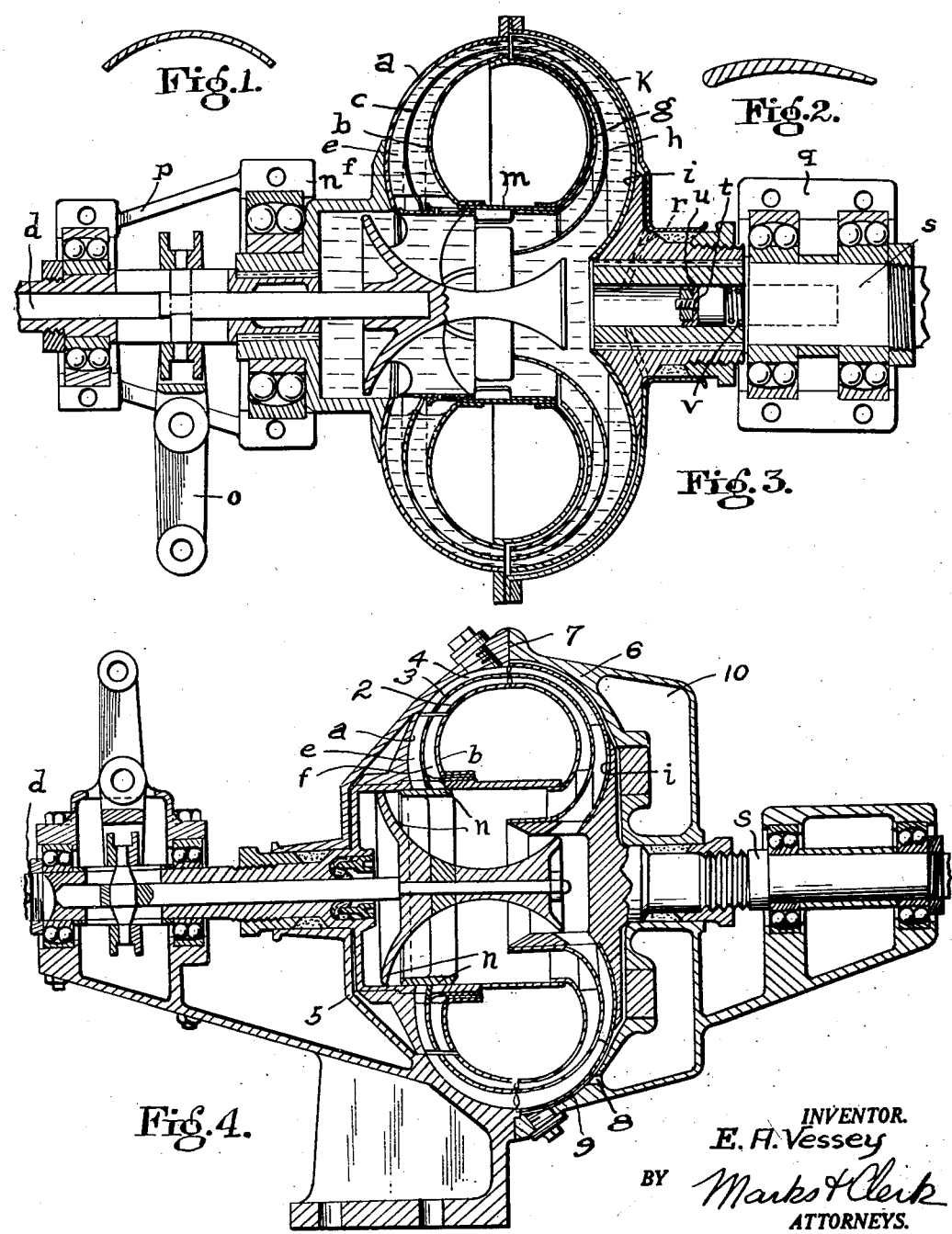

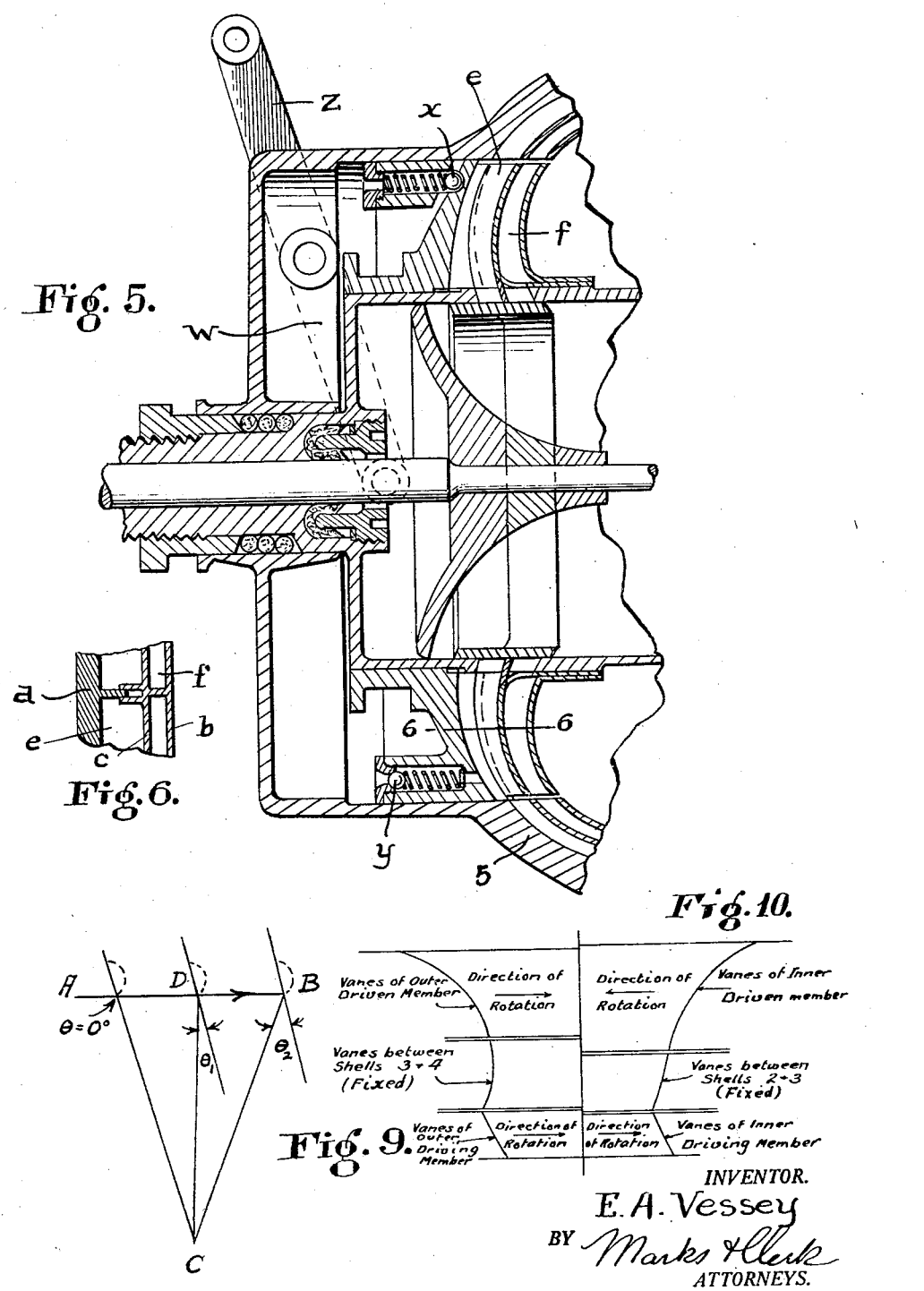

Sept. 4, 1934.  E. A. VESSEY  1,972,175
HYDRAULIC INFINITELY VARIABLE SPEED TRANSMISSION MECHANISM
Filed June 20, 1929  3 Sheets-Sheet 3

E. A. Vessey
INVENTOR
By: Marks & Clerk

Patented Sept. 4, 1934

1,972,175

UNITED STATES PATENT OFFICE 1,972,175

HYDRAULIC INFINITELY VARIABLE SPEED TRANSMISSION MECHANISM

Ernest Abington Vessey, Finchley, London, England

Application June 20, 1929, Serial No. 372,423. In Great Britain and Irish Free State November 1, 1923

2 Claims. (Cl. 60—54)

This application is a continuation in part of my copending application filed on the 15th day of September, 1924, No. 737,906.

This invention relates to hydraulic infinitely variable speed transmission mechanism, that is to say mechanism which enables an infinite number of variations in speed ratio to be obtained between two limits for which the mechanism is designed.

Prior to the present invention it has been considered essential to provide intermediate guide blades between the impeller and propeller of hydraulic speed mechanism, the inclination of such guide blades being varied with every variation in speed transmission ratio in order that the very rapid drop in efficiency attendant upon any departure from one specific speed ratio may be avoided.

According to the present invention the need for such variable guide blades is entirely avoided or in other words an infinitely variable hydraulic speed mechanism is provided wherein good efficiency may be maintained over the whole range of operation of the gear without the need for any variable guide blades. The invention provides a mechanism moreover wherein the speed of the propeller member (i. e. driven member) automatically adjusts itself in accordance with the load of the moment. This result is attained by the incorporation of special features which are more particularly set out in the appended claims.

Referring to the accompanying diagrammatic drawings:—

Figures 1 and 2 are cross-sectional views of two forms of vanes.

Figure 3 represents a side elevational view partly in vertical section of a convenient construction in accordance with the present invention.

Figure 4 is a vertical longitudinal section of a modified construction.

Figure 5 is a vertical cross-sectional view of part of a modified construction,

Figure 6 is a fragmental sectional view on the line 6—6 of Figure 5.

Figures 7, 8, 9 and 10 are explanatory diagrams.

Figure 7:
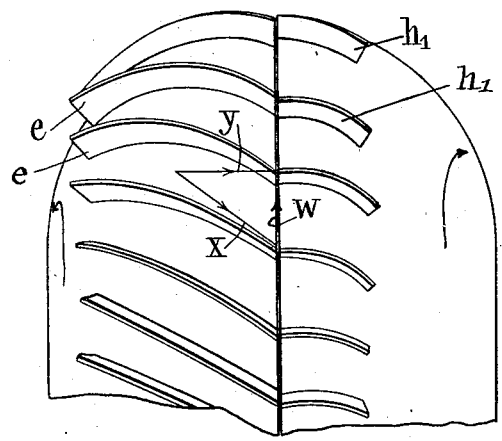

In carrying the invention into effect in one convenient form by way of example with reference to Figure 3, the driving member or impeller comprises a hollow drum in the form of a circular trough which is approximately semi-circular in cross section and is composed of an outer shell $a$, an inner shell $b$ and a third shell $c$ disposed between them. The three shells are arranged with the plane surface of the trough vertical and with a common axis which forms a continuation of the axis of the driving shaft $d$. The shells are not contiguous but are separated each from each by definite annular spaces $e$ and $f$. The spaces between the shells when considering any particular spherical radius are approximately but not necessarily equal but both spaces decrease in width as the radial angle increases.

Between adjacent shells are arranged a number of vanes as in a centrifugal pump but the vanes between the inner shell $b$ and middle shell $c$ are of disposition and curvature differing from that of the vanes between the middle shell $c$ and outer shell $a$ in order to secure a reverse drive. The combination in the completed member of adjacent shells and the vanes between them may be likened to the runner of a centrifugal pump revolving in a vertical plane but giving an annular discharge stream with the axis of the annulus horizontal. The suction inlet will be described below.

The driven member or propeller is broadly of similar form to the driving member and is arranged so that its axis of rotation forms a continuation of that of the driving member.

The annular orifices between corresponding adjacent shells of both members are arranged to lie mutually opposite and as close together as possible so that liquid discharged from the driving member is received by and passed through the driven member. Driving vanes are provided between adjacent shells $g$ and $h$ and $h$ and $i$ composing the driven member but may differ in disposition and in form either from each other or from those in the corresponding driving member or both.

The driving vanes in either or both chambers of the driven member are rigidly attached to adjacent shells. The flow of the liquid is always from the axis radially outwards towards the outer circumference, then radially inwards towards the axis and along the axis to its starting point. In other words the liquid is caused to move in stream-lines having closed paths, the projection of a stream-line upon a plane containing and bounded on one side by the axis of the gear approximating either to a circle or an ellipse as the case may be.

The driving and driven members have intercommunication at the common centre by an axial tube $m$ integral with or attached to the driving member and arranged to revolve within the other member and having a suitable packed joint between them if necessary.

The inner and outer shells of the driving member are extended by integrally formed or detachable portions $j$ and $k$ which form respectively a lining for and jacket to the driven member. Packed joints are provided where necessary to allow of one member revolving within the other without loss of the contents.

In the axial tube $m$ connecting the driving and driven members is provided a hollow piston valve $n$ so arranged that it may be externally operated by the lever $o$ completely or partially to cut off the flow of fluid to either one or the other of the chambers $e$ and $f$ in the driving member.

The axial tube and the spaces between the several shells of the driving and driven members are completely filled with water, oil or any other suitable liquid.

Means may be provided for varying the cubic content of the liquid space of both driving and driven members. Such an arrangement is shown by way of example in respect of one member in Figure 5, in which a receptacle is formed in the half case 5 and the outer shell $a$ of the driving member is made slidable to form a movable diaphragm. One or more valves are provided in the diaphragm as shown at $y$ to give fluid access from the receptacle to the active liquid space $e$ and one or more valves $x$ to give opposite access. A groove is formed in the boss of the diaphragm engaging in the usual manner with a forked lever $w$ which is operated by the exterior lever $z$. By this means the cubic content of the active liquid space $e$ may be adjusted whether the driving member is revolving or at rest.

A convenient means of forming extensible vanes to allow sliding of the diaphragm is shown in Figure 6, which is self-explanatory.

Leakage of liquid is prevented by connecting the leak space by way of a radial hole $r$ to the centre of the driven shaft which communicates directly with the centre of the driven shell at which point the circulating liquid sets up an injector effect.

Expansion in the liquid due to heating is compensated for by means of a floating piston $t$ operating in a central chamber formed in the driven shaft $s$.

The piston is packed with the usual leather cup washer $u$ and is resisted in its motion by a light compression spring $v$.

A large amount of data has been published in relation to aerofoils subjected to a stream of air and definite reaction coefficients for a variety of sections have been obtained. Tables of such data may be found for instance in "Properties of Aerofoils and Aerodynamical Bodies" by A. W. Judge (Whittaker & Co.), many of which may be used in the design of gears in accordance with the present invention.

Judge's factor $C_L$ is the coefficient required and this is known to be applicable to sections operating in water as well as in air by correcting for density.

Figures 1 and 2 show two typical forms of profile of propeller vane, Figure 1 being known as a circular profile with constant thickness and Figure 2 as a stream-line profile. I have found that circular profiles are more suitable for low speed range (say 1/1–4/1) and stream-line profiles for higher ranges.

It is to be understood that Figures 1 and 2 are given merely by way of example and that it is not necessary to adhere solely to either of them or to any particular section given by Judge.

According to my present invention the vane profile of the driven member or propeller is first chosen so that the range of $C_L$ between maximum and minimum is consistent with the speed range of the gear to be designed, e. g. if the speed range is to be 1/1 to 4/1 a section must be chosen giving $C_L$ maximum at least four times $C_L$ minimum, such as Judge's No. 4, known as Eiffel No. 4, and particulars of which are given by way of example in the table.

Table

| Eiffel No. 4, circular curvature, camber 1/7, 90 x 15 cm. | $\theta$ = angle of incidence in degrees | $C_L$ = coefficient of reaction at right angles to fluid stream |
|---|---|---|
|  | 0 | .1760 |
|  | 3 | .3860 |
|  | 5 | .5040 |
|  | 7 | .6100 |
|  | 10 | .6800 |
|  | 15 | .7200 |
|  | 20 | .7500 |

The character of curves obtained by plotting similar data in respect of all sections of aerofoil is the same in so far as they all rise rapidly to a maximum as the angle of incidence $\theta$ is increased and either remain approximately horizontal or fall off more or less rapidly.

The difference between aerofoils lies in the value of the maximum and the value of $\theta$ at which the maximum is attained.

It is, however, found that in aerofoils having a useful range of reaction a variation of $\theta$ from 0 to approximately 15° or 20° must not be exceeded if efficient reaction is to be expected, and therefore the whole range of variation of $\theta$, i. e., the variation of $\theta$ corresponding to rest and full speed of the propeller should not be less than 15° or more than 35°.

In Figure 9 one vane of a propeller is shown moving at full speed with a velocity A. B. in the direction of the arrow. The velocity of the fluid stream impinging upon it is represented in amount and direction by C. B., the velocity relative to the vane therefore being C. A. It will thus be seen that whereas the angle of incidence $\theta$, i. e. the angle between the fluid direction and chord of the section is 0 when the vane velocity is A. B. (i. e. full speed) it will gradually increase as the vane velocity falls, as shown, to $\theta_1$ when the vane velocity has fallen to D. B. and to $\theta_2$ when the vane is at rest. The angle A. C. B. therefore (the angle between the virtual velocity vector corresponding to propeller full speed and the absolute velocity vector) as shown above should be limited approximately to from 15° to 35°.

It will also be seen that if A. B. represents maximum vane velocity, there is a definite relation between this and C. B. the absolute velocity of the fluid stream and that this relation will vary if the angle A. B. C. between C. B. and the line of motion of the vane is varied. The relation between the propeller vane profile and its characteristics and the other features varies considerably according to the profile used but may be broadly stated thus: The absolute velocity of the fluid stream C. B. (Figure 9) directed against the propeller vanes should be approximately 1½ to 3 times the linear velocity of the vane at full speed i. e. A. B. (Figure 9) and the absolute direction about 60° to 80° with the propeller face.

The angle between the velocity vectors for the liquid corresponding to maximum and minimum speeds of the driven member should not exceed the difference in angle of incidence corresponding to maximum and minimum coefficient of reaction for the vane profile chosen, or in other words the angle between the velocity vector corresponding to maximum speed of the driven member and the absolute velocity vector should not be less than about 15° or more than about 35°.

In the actual design of gears according to the present invention the following formulæ are used, the symbols employed being as follows:—

$b$ = width of impeller passage (ins.) measured at right angles to the fluid flow at the outer circumference of the impeller.

$r_1$ = extreme radius (ins.) of impeller measured at centre of passage.

$r_2$ = extreme radius (ins.) of propeller measured at centre of passage.

$n_1$ = impeller speed (R. P. S.)

$n_2$ = propeller speed (R. P. S.)

$v$ = absolute velocity of liquid (ft/sec)

$v_1$ = linear velocity (ft/sec) of outer circumference of impeller.

$v_2$ = linear velocity (ft/sec) of outer circumference of propeller at $n_2$.

$v_3$ = virtual velocity of liquid (ft/sec) corresponding to $v_2$.

$v_4$ = radial velocity of liquid through impeller (ft/sec).

$w$ = static weight of liquid in impeller (lb.).

$\phi$ = angle between $v_3$ and $v_2$.

HP = horse power applied to impeller.

$$a = \frac{n_2}{n_1}$$

$C_L$ = coefficient of reaction from aeronautical data.

$$d = \frac{v}{v_2}$$

$$e = \frac{v_3}{v}$$

$$f = \frac{b}{r_1}$$

$$g = \frac{w}{fr_1^3}$$

$k$ = a constant.

The formulæ are:—

$$k = \frac{40240 \ HP}{C_L f d^2 e^2 a^3 n_1^3 \sin \phi} \quad (1)$$

$$r_1 = \left(\frac{48300 \ HP}{k^5 g f^2 e^2 a C_L n_1^3 \sin \phi}\right)^{\frac{1}{5.5}} \quad (2)$$

$$r_2 = \left(\frac{k}{r_1}\right)^{\frac{1}{4}} \quad (3)$$

$$v = \left(\frac{9884 \ HP}{C_L f e^2 r_1 r_2^2 a n_1 \sin \phi}\right)^{\frac{1}{2}} \quad (4)$$

$$v_4 = \left(\frac{v^2}{2} \pm \frac{1}{2}\sqrt{v^4 - \frac{620 \times 10^6 HP^2}{f^2 r_1^6 n_1^3}}\right)^{\frac{1}{2}} \quad (5)$$

The solution is now a matter for trial and error.

A propeller vane profile is selected and $C_L$ is thus determined.

A mean value is given to $d$ (say 2).

A mean value is given to $\phi$ (say 70°).

A trial value is given to $f$ (say .05).

A trial value is given to $g$ (say .2).

A trial value is given to $e$ (say 1).

These values are inserted in the equations which are then solved for $k$, $r_1$ $r_2$ $v$ and $v_4$.

The circuit is then laid out and the static weight of liquid in the impeller ascertained from the drawing. This should agree with $w = fgr_1^3$, and the trial values for the various constants $d$ $\phi$ $f$ $g$ and $e$ must be adjusted until agreement is secured.

The anti-centrifugal head generated in the propeller is:—

$$v_5 = \{w_1(v_2^2 - v_6^2)\}^{\frac{1}{2}}$$

where $v_5$ = anti-centrifugal head velocity, $v_6$ = linear velocity (ft/sec) of inner circumference of propeller, $w_1$ = static weight of liquid in the propeller (lb.).

This must be calculated for various speeds and deducted from the velocity due to centrifugal head in the impeller and the resulting propeller torque considered under the differential effect. The values derived should agree with the torque required at each speed and the constants must be adjusted until agreement is satisfactory.

The reverse circuit if required may lie either within or around the forward circuit and is treated in a manner similar to that already described with the exception that the slope of the grid vanes is reversed.

From the data obtained as above the profile of the vanes of the impeller and grid or grids if employed (as in Figure 4) throughout the gear may be laid out by the well-known rules as applied to centrifugal pumps or turbines.

According to a modification, as shown in Figure 4, one member is reduced in outer diameter to form in section only part of a semi-circle, the remainder of the approximately semi-circular section being composed of a fixed member known as the grid.

The grid consists of an inner shell 2, a middle shell 3 and outer shell 4 with vanes between them so shaped as to direct the liquid receiver from the driving member. Thus the vanes between the middle and outer shells 3 and 4 respectively may be shaped to suitably direct the liquid to secure rotation of the driven member in the same direction as the driving member and those between the inner and middle shells 2 and 3 respectively may be shaped to secure a reverse rotation.

Each shell of the grid is coaxial with and a geometric continuation of its corresponding shell in the driving and driven member.

The driven member in this form is similar to that already described with reference to Figure 3 and the same references are inserted in the two figures in respect of corresponding parts.

The extensions $j$ and $k$ of the driving member forming a lining for and jacket respectively to the driven member of Figure 1 are dispensed with in Figure 4, being replaced in the case of $k$ by an extension to the grid 6. An extension 5 forms a suitably packed case for the driving member and an extension 6 forms a similar case for the driven member. A joint between the cases is provided at 7 for convenience of assembly. The bearing for the driving member may be formed integrally with or (as shown) rigidly attached to the half case 5.

Expansion in the liquid is compensated for by providing an air chamber 10 in the half case 6 surrounding the driven member, completely sealed except for one small hole 8 communicating with the working chamber 9 at the lowest point through which the expanding liquid may pass with corresponding compression of the air content. Upon subsequent contraction of the liquid the portion which entered the air chamber 10 is automatically returned to the working chamber 9 by the compressed air. In this form the floating piston $t$ is dispensed with but the case may be cooled if necessary. Throughout the above description the various members of the gear have been composed of three shells forming two annular chambers each containing vanes but it is to be understood that either or all members may be composed of any number of coaxial shells the shape of the vanes between successive shells being graded in any desired manner. In such a gear each annular chamber with its vanes would be put into communication in succession with the working chamber by means of a valve conveniently of the form already described.

Referring to the diagram in Figure 7, $e$, $e$ represent two of the outermost set of vanes on the driving member (or impeller) while $h_1$, $h_1$ represent two vanes on the outermost set of vanes on the driven member (or propeller); $x$ represents the relative direction of the liquid leaving the vanes $e$, $e$; $w$ represents the direction and magnitude of peripheral speed of the vanes $e$, $e$, and $y$ represents the resultant or absolute velocity and direction of the liquid impinging on the vanes $h_1$, $h_1$.

The directions of rotation of the impeller and propeller are identical as indicated by the arrows adjacent the vanes in Figure 7.

Figure 8:
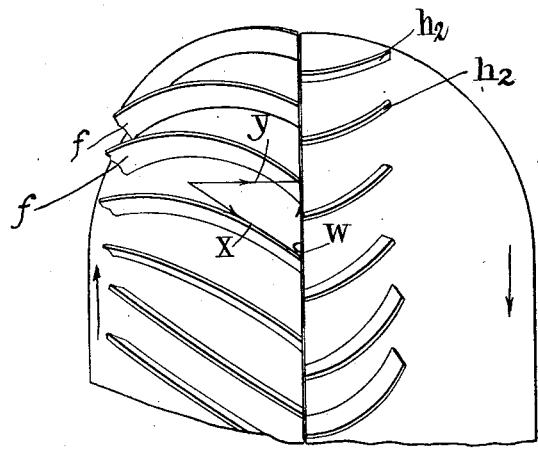

In Figure 8 $f$, $f$ illustrate two of the innermost set of vanes on the driving member (which may be identical with $e$, $e$ of Figure 7). $x$, $w$ and $y$ represent the same quantities as referred to with reference to Figure 7. The vanes $h_2$, $h_2$ are two vanes of the innermost set on the propeller and it will be obvious that the direction $y$ of the water is such that the propeller will be caused to rotate in the opposite direction to that of the impeller to give a reverse drive.

In operation, on starting the engine or other prime mover and thus causing the driving member of the gear to revolve slowly the liquid contained therein is subjected to centrifugal force which causes circulation of the fluid throughout the system. The vanes in the driving member, (or grid if employed) are so disposed that they direct the discharge in such a manner as to meet the vanes in the driven member in a direction adapted to cause the latter to exert a turning moment on the driven shaft.

When the engine is running slowly the forces generated by the circulating liquid are insufficient to overcome the resistance of the driven member but a critical speed is reached at which the driven member commences to move and as the engine speed is increased the driven member will also accelerate until it arrives at the maximum speed consistent with the HP output of the engine for the load of the moment, the engine meanwhile having reached its top speed.

A decrease in driven load within the limits of the gear will cause the driven member to accelerate and vice versa, while the engine speed remains constant.

The automatic feature results in the following manner:—The discharge of the driving member is caused and regulated by the centrifugal force generated in the contained liquid and directed by the vanes. Suppose that the driven member is held at rest and that the driving member is revolving at top speed. The velocity of circulation and change of direction of the liquid under these conditions are at their maximum and the consequent pressure on the vanes of the driven member is also at a maximum, thus giving the requisite high starting torque.

The driven member is now allowed to rotate and to gather speed in consequence of which the liquid momentarily contained therein is also subjected to centrifugal force but acting in such a direction as to oppose the flow and therefore to decrease the velocity of discharge of the driving member. The change of direction in the liquid stream is also decreased. It is easy to realize that a balance must be struck somewhere and that this is secured when the velocity of flow and change of direction have been reduced to such values as to provide only just sufficient vane pressure in the driven member to overcome the load of the moment.

The action is thus dependent not only upon change of direction in the flow but also upon the differential effect upon a circulating liquid of two opposed centrifugal forces set up within the liquid itself, sufficient velocity being always automatically left in the fluid to overcome the momentary load on the driven member.

It will be appreciated that by suitably arranging the profile and number of the vanes in the driving member and grid or grids and the resultant centrifugal force it is possible to cause the driven member to revolve at a speed greater than that of the driving member, consequently the gear may be used as a speed-up gear if required.

In cases where a reverse drive is desired the gear is made up of two separate circulating systems (either or both of which may consist of one or more annular spaces provided with vanes), one of which is used for driving ahead and the other for reversing, the vanes in each being suitably disposed for the purpose. Either may be put in operation at will by manipulation of the valve described. It will be seen that in addition to the inherent feature of the gear whereby any tendency of the driven member to overrun the driving member is immediately communicated to the engine, this braking action may be augmented by placing the valve partially in the reverse position. The effect will be precisely similar to that secured in cases of emergency in locomotives by admitting steam to the cylinders in the reverse direction when the engine is running ahead.

In cases of emergency the driver may assume control of the gear by suitable manipulation of the central valve thereby choking the liquid stream, reducing the resultant velocity and thus causing the turning moment on the driven shaft to fall off.

Further, by means of the valve he may simultaneously close both suction inlets, thereby securing a definite neutral gear position.

The examples and constructional modifications described above are given by way of illustration and may be modified.

It will be appreciated that according to the present invention gears may be constructed wherein automatic variation in speed ratio over a considerable range of speed takes place at practically constant high efficiency without recourse to the use of variable guide blades interposed between the impeller and propeller.

Having now described my invention what I claim as new and desire to secure by Letters Patent is:—

1. A variable transmission gear of the character described, comprising a drive shaft, a coaxial driven shaft, coaxial driving and driven rotors mounted respectively on said shafts, said rotors having blades extending in a direction radial from said shafts and curved towards a meeting plane extending at right angles to said shafts, the blades being arranged in an outer and an inner series on each rotor, the blades in both series of the driving rotor being inclined in substantially the same direction, the blades in one series of the driven rotor being inclined oppositely to the blades in the other series of the driven rotor, a valve coaxial with the shafts and extending over both series of blades of the driving rotor, said valve being operable to close the space between the blades of either series on the driving rotor whereby the device by movement of the valve axially may cause the operation of the driven shaft either forwardly or reversely while the drive shaft operates continuously in the same direction.

2. A variable transmission fluid controlled gear of the character described, comprising driving and driven rotors, each rotor having an inner and outer series of blades, the outer series of blades encompassing the inner series of blades and all the blades extending in the general direction radial to the rotor axes, then curved to meet each other in a plane extending at right angles to said axes, the blades in one of the series on each rotor being inclined in the same general axial direction while the blades in the other series of the driven rotor are inclined oppositely to the blades in the other series of the driving rotor and a valve to control the flow of fluid to the respective series.

ERNEST ABINGTON VESSEY.